United States Patent
Pulickal Aravindakshan et al.

(10) Patent No.: US 12,386,703 B2
(45) Date of Patent: Aug. 12, 2025

(54) SYSTEM AND METHODS FOR PARITY CALCULATION IN STORAGE ARRAYS

(71) Applicant: Microchip Technology Incorporated, Chandler, AZ (US)

(72) Inventors: Anoop Pulickal Aravindakshan, Karnataka (IN); Raja Sekhar Reddy Bannuru, Karnataka (IN)

(73) Assignee: Microchip Technology Incorporated, Chandler, AZ (US)

( * ) Notice: Subject to any disclaimer, the term of this patent is extended or adjusted under 35 U.S.C. 154(b) by 14 days.

(21) Appl. No.: 18/637,549

(22) Filed: Apr. 17, 2024

(65) Prior Publication Data

US 2025/0068518 A1    Feb. 27, 2025

(30) Foreign Application Priority Data

Aug. 25, 2023  (IN) .............................. 202311057216

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0689* (2013.01)

(58) Field of Classification Search
CPC .. G06F 11/1076; G06F 3/0619; G06F 3/0659; G06F 3/0689
See application file for complete search history.

(56) References Cited

U.S. PATENT DOCUMENTS

| | | | |
|---|---|---|---|
| 7,546,483 B1 | 6/2009 | Overby et al. | 714/6.11 |
| 2018/0032265 A1* | 2/2018 | Kotzur | G06F 11/108 |
| 2020/0348958 A1* | 11/2020 | Krasner | G06F 9/45558 |
| 2021/0117123 A1* | 4/2021 | Jakowski | G06F 3/0689 |

OTHER PUBLICATIONS

International Search Report and Written Opinion, Application No. PCT/US2024/043526, 13 pages, Nov. 18, 2024.

* cited by examiner

*Primary Examiner* — Bryce P Bonzo
*Assistant Examiner* — Xinyuan Yu
(74) *Attorney, Agent, or Firm* — SLAYDEN GRUBERT BEARD PLLC

(57) ABSTRACT

A system may include a storage array comprised of one or more array member drives. The storage array may be partitioned into stripes of data across the one or more array member drives. In operation, a DMA controller may move source data from a processor memory and may write the data to an accelerator memory. The accelerator may perform a parity calculation and a DMA controller may write the parity result and the source data to at least one of the array member drives. The parity information may be used to reconstruct data in the one or more array member drives in the case of damage or loss of data.

18 Claims, 3 Drawing Sheets

SYSTEM AND METHODS FOR PARITY CALCULATION IN STORAGE ARRAYS

PRIORITY

This application claims priority to commonly owned Indian Provisional Patent Application No. 202311057216 filed Aug. 25, 2023, the entire contents of which are hereby incorporated by reference for all purposes.

FIELD OF THE INVENTION

The present disclosure relates to systems and methods for parity calculations in a storage array of memory devices.

BACKGROUND

In high-density data storage applications, redundant data may be stored to protect against any loss of information. Additionally, a block of data may be written across multiple drives, in what are called stripes, and parity information may be stored along with the data. In the event of a failure in one drive, the parity information may be used to recover any lost data.

In one of various examples, a high-density storage application may be implemented as a Redundant Array of Independent Disks (RAID) array. In one example of a RAID array, multiple drives may be partitioned into stripes, and consecutive segments of data may be stored across different memory devices. In one of various examples, M individual drives, numbered 1 to M may, respectively, be partitioned into N stripes, the stripes numbered from 1 to N. Individual drives may be partitioned into strips of data, each strip comprising a plurality of contiguous memory locations. One strip of data from each of the M individual drives may, in combination, comprise a stripe. Parity may be computed on a stripe-wide basis across the M drives. In this example, to compute the parity information for the first stripe, a parity calculation may be performed on the data in stripe #1 for, based on the data in the respective strip from each of drives 1 to M−1, and the result stored in drive M.

A system processor, such as a central processing unit (CPU) may be used in calculation of the parity information. However, this may take system processor resources away from critical system operations and may result in delays in critical functions of the system processor.

There is a need for a system and method to compute parity information in a storage array that offloads the processing overhead from the system processor.

SUMMARY

The examples herein enable systems and methods for parity calculations in an array comprised of one or more array member drives.

According to one aspect, a system includes a processor, a processor memory coupled to the processor, a storage array comprising one or more array member drives, an accelerator, an accelerator memory, and a communication circuit. The communication circuit may include a Direct Memory Access (DMA) circuit. The communication circuit may be coupled to the processor, the accelerator, the accelerator memory, and the storage array. The processor may instruct the communication circuit to move source data between the processor memory and the accelerator memory. The accelerator may perform a parity calculation on the source data stored in the accelerator memory. The DMA circuit may write the parity result and the source data to the one or more array member drives.

According to one aspect, a method includes steps of: initiating a parity calculation by a processor, moving source data by a DMA transfer from a processor memory to an accelerator memory, the accelerator to calculate parity information, the parity information based on the source data moved to the accelerator memory. Additional steps may include storing the calculated parity information in a predetermined location in the accelerator memory, issuing notification from the accelerator to the processor, the notification to indicate the completion of the parity calculation. Additional steps may include issuing a command from the processor to one of a plurality of array member drives, moving the parity data from the predetermined location in the accelerator memory to one of the plurality of array member drives and moving the source data from the accelerator memory to at least one of the array member drives, and issuing a notification from one of the plurality of array member drives to the processor.

DETAILED DESCRIPTION

Figure 1:
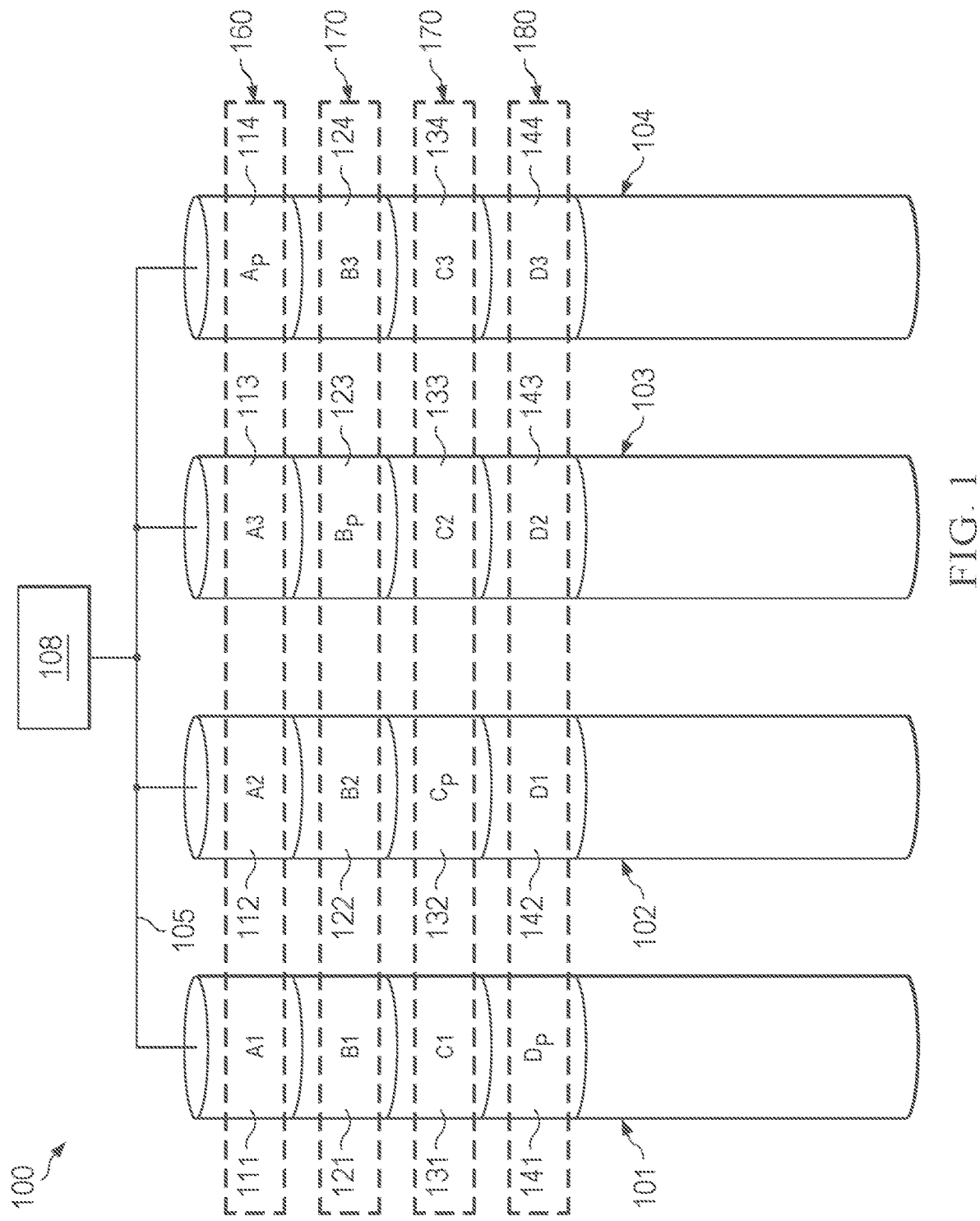
FIG. 1 illustrates one of various examples of a storage array device.

FIG. 1 illustrates one of various examples of a storage array device 100. Storage array device 100 may be comprised of four array member drives 101, 102, 103, and 104. Storage array device 100 illustrated in FIG. 1 may be comprised of four array member drives, but this is not intended to be limiting. Other examples may include more than four array member drives or may include fewer than four array member drives. The example illustrated in FIG. 1 may be a RAID array device, but the device may be a storage array device utilizing another architecture, including but not limited to JBOD ("Just a Bunch of Disks"), SPAN/BIG and MAID ("Massive Array of Idle Disks").

Array member drives 101, 102, 103 and 104 may, respectively, be non-transitory memory devices, including but not limited to Dynamic Random Access Memory (DRAM), Non-Volatile Memory (NVM), Embedded Non-Volatile Memory (eNVM), or another type of non-transitory memory not specifically mentioned. Array member drives 101, 102, 103 and 104 may be, respectively, member drives of storage array device 100.

Array member drives 101, 102, 103 and 104 may, respectively, be coupled to memory bus 105. Memory bus 105 may be coupled to processor 108. Processor 108 may be a CPU or other processing device. Processor 108 may drive signals onto memory bus 105 to read data from array member drives 101, 102, 103 and 104, and may drive signals onto memory bus 105 to write data to array member drives 101, 102, 103 and 104.

Memory bus 105 may be a Peripheral Component Interconnect (PCI) bus, a Peripheral Component Interconnect Express (PCIe) bus, a Universal Serial bus (USB), or another type of bus protocol not specifically mentioned.

Array member drive 101 may be divided into strips. As one of various examples, array member drive 101 may include strips 111, 121, 131 and 141. The example illustrated in FIG. 1 is not intended to be limiting. Other examples may include more strips or fewer strips than the number shown in FIG. 1.

Array member drive 102 may be divided into strips. As one of various examples, array member drive 102 may include strips 112, 122, 132 and 142. The example illustrated in FIG. 1 is not intended to be limiting. Other examples may include more strips or fewer strips than the number shown in FIG. 1.

Array member drive 103 may be divided into strips. As one of various examples, array member drive 103 may include strips 113, 123, 133 and 143. The example illustrated in FIG. 1 is not intended to be limiting. Other examples may include more strips or fewer strips than the number shown in FIG. 1.

Array member drive 104 may be divided into strips. As one of various examples, array member drive 104 may include strips 114, 124, 134 and 144. The example illustrated in FIG. 1 is not intended to be limiting. Other examples may include more strips or fewer strips than the number shown in FIG. 1.

Storage array device 100 may be partitioned into horizontal stripes. First stripe 160 may include strips 111, 112, 113 and 114. Second stripe 170 may include strips 121, 122, 123 and 124. Third stripe 180 may include strips 131, 132, 133 and 134. Fourth stripe 190 may include strips 141, 142, 143 and 144.

In operation, a block of data may be stored within a stripe. The block of data may be stored in multiple array member drives within the stripe. In the example illustrated in FIG. 1, a first block of data may be partitioned and a first portion stored in array member drive 101 at strip 111, the data labelled A1, a second portion stored in array member drive 102 at strip 112, the data labelled A2, and a third portion stored in array member drive 103 at strip 113, the data labelled A3.

At array member drive 104, strip 114 may store parity information based on the data stored in strips 111, 112 and 113, the parity information labelled Ap. Parity information may also be termed parity data. In one of various examples, the parity information may be computed as a logical XOR of the data stored in strips 111, 112 and 113. Parity information may be computed by processor 108. In this manner, if any one of the array member drives 101, 102, 103 or 104 may be corrupted or damaged, the corrupted or damaged data may be recovered based on the data in the non-damaged array member drives. In this manner, first stripe 160 may store data and parity information.

In the example illustrated in FIG. 1, a second block of data may partitioned and a first portion stored in array member drive 101 at strip 121, the data labelled B1, a second portion stored in array member drive 102 at strip 122, the data labelled B2, and a third portion stored in array member drive 104 at strip 124, the data labelled B3.

At array member drive 103, strip 123 may store parity information based on the data stored in strips 121, 122 and 124, the parity information labelled Bp. In one of various examples, the parity information may be computed as a logical XOR of the data stored in strips 121, 122 and 124. Parity information may be computed by processor 108. In this manner, if any one of the array member drives 101, 102, 103 or 104 may be corrupted or damaged, the corrupted or damaged data may be recovered based on the data in the non-damaged array member drives. In this manner, second stripe 170 may store data and parity information.

In the example illustrated in FIG. 1, a third block of data may partitioned and a first portion stored in array member drive 101 at strip 131, the data labelled C1, a second portion stored in array member drive 103 at strip 133, the data labelled C2, and a third portion stored in array member drive 104 at strip 134, the data labelled C3.

At array member drive 102, strip 132 may store parity information based on the data stored in strips 131, 133 and 134, the parity information labelled Cp. In one of various examples, the parity information may be computed as a logical XOR of the data stored in strips 131, 133 and 134. Parity information may be computed by processor 108. In this manner, if any one of the array member drives 101, 102, 103 or 104 may be corrupted or damaged, the corrupted or damaged data may be recovered based on the data in the non-damaged array member drives. In this manner, third stripe 180 may store data and parity information.

In the example illustrated in FIG. 1, a fourth block of data may partitioned and a first portion stored in array member drive 102 at stripe 142, the data labelled D1, a second portion stored in array member drive 103 at stripe 143, the data labelled D2, and a third portion stored in array member drive 104 at stripe 14, the data labelled D3.

At array member drive 101, strip 141 may store parity information based on the data stored in strips 142, 143 and 144, the parity information labelled Dp. In one of various examples, the parity information may be computed as a logical XOR of the data stored in strips 142, 143 and 144. Parity information may be computed by processor 108. In this manner, if any one of the array member drives 101, 102, 103 or 104 may be corrupted or damaged, the corrupted or damaged data may be recovered based on the data in the non-damaged array member drives. In this manner, fourth stripe 190 may store data and parity information.

The number of array member drives, strips and stripes illustrated in FIG. 1 is not intended to be limiting.

Figure 2:
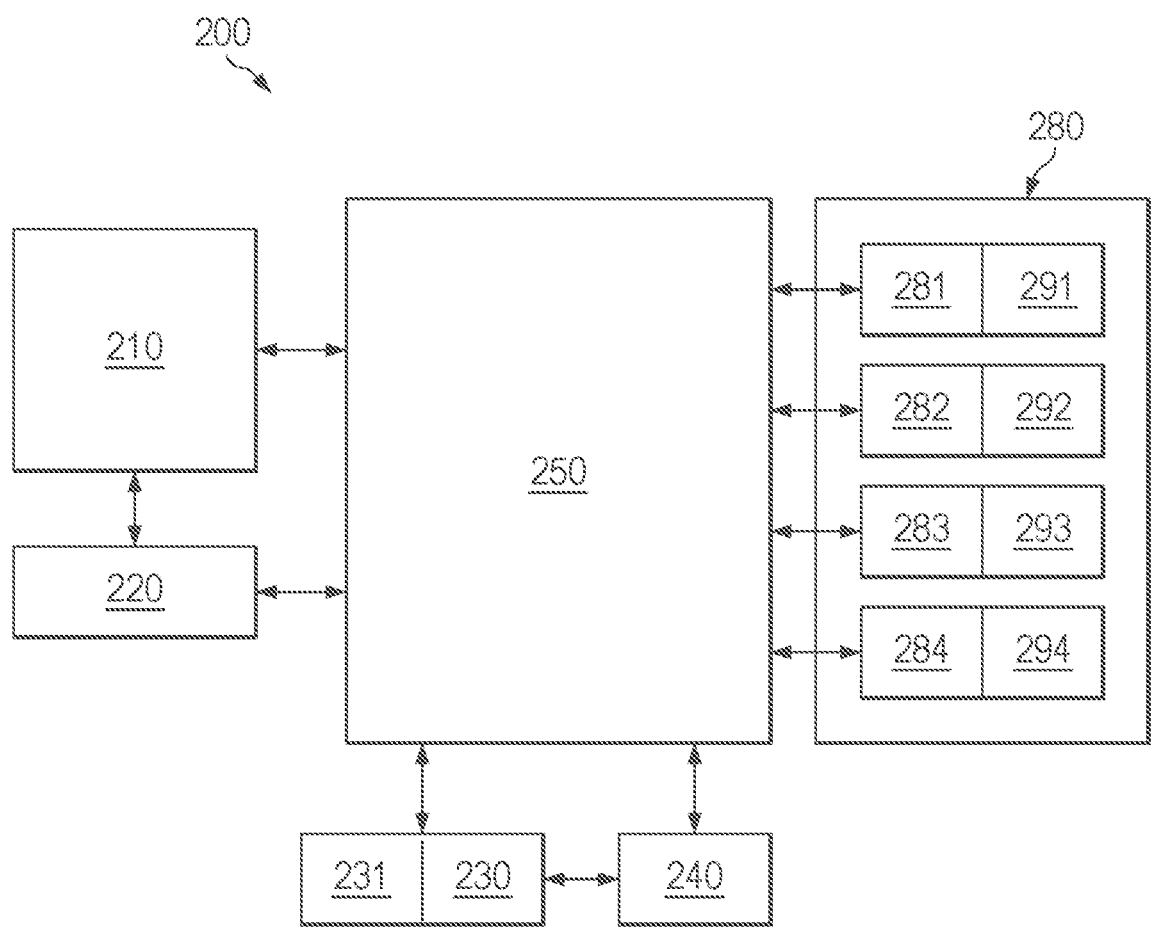
FIG. 2 illustrates one of various examples of a system for computing parity information in a storage array.

FIG. 2 illustrates one of various examples of a system for computing parity information in a storage array.

Processor 210 may be coupled to a communication circuit 250. Communication circuit 250 may receive data from processor 210 and may transmit the received data to one or more circuits coupled to communication circuit 250. Processor 210 may be coupled to processor memory 220.

In one of various examples, communication circuit 250 may include encoder circuits and decoder circuits to transmit and receive data based on one or more communication protocols. In other examples, communication circuit 250 may include direct wired connections between elements.

Storage array 280 may be comprised of array member drives 281, 282, 283, 284.

Array member drive 281 may include DMA controller 291. DMA controller 291 may move data between accelerator memory 230, processor memory 220, and array member drive 281. DMA controller 291 may write data to array member drive 281 and may read data from array member drive 281.

Array member drive 282 may include DMA controller 292. DMA controller 292 may move data between accelerator memory 230, processor memory 220, and array member drive 282. DMA controller 292 may write data to array member drive 282 and may read data from array member drive 282.

Array member drive 283 may include DMA controller 293. DMA controller 293 may move data between accelerator memory 230, processor memory 220, and array member drive 283. DMA controller 293 may write data to array member drive 283 and may read data from array member drive 283.

Array member drive 284 may include DMA controller 294. DMA controller 294 may move data between accelerator memory 230, processor memory 220, and array member drive 284. DMA controller 294 may write data to array member drive 284 and may read data from array member drive 284.

Accelerator memory 230 may be coupled to communication circuit 250. Accelerator memory 230 may include DMA controller 231. DMA controller 231 may move data between accelerator memory 230, processor memory 220, and one or more of array member drives 281, 282, 283, and 284. DMA controller 231 may write data to accelerator memory 230 and may read data from accelerator memory 230.

Accelerator memory 230 may be coupled to accelerator 240. Accelerator 240 may write data to accelerator memory 230 and may read data from accelerator memory 230.

Array member drive 281 may be a non-transitory memory device, including but not limited to DRAM, NVM, eNVM, or another type of non-transitory storage not specifically mentioned. Array member drive 281 may be coupled to communication circuit 250. DMA controller 291 may control reading of data from array member drive 281 and may control writing of data to array member drive 281.

Array member drive 282 may be a non-transitory memory device, including but not limited to DRAM, NVM, eNVM, or another type of non-transitory storage not specifically mentioned. Array member drive 282 may be coupled to communication circuit 250. DMA controller 292 may control reading of data from array member drive 282 and may control writing of data to array member drive 282.

Array member drive 283 may be a non-transitory memory device, including but not limited to DRAM, NVM, eNVM, or another type of non-transitory storage not specifically mentioned. Array member drive 283 may be coupled to communication circuit 250. DMA controller 293 may control reading of data from array member drive 283 and may control writing of data to array member drive 283.

Array member drive 284 may be a non-transitory memory device, including but not limited to DRAM, NVM, eNVM, or another type of non-transitory storage not specifically mentioned. Array member drive 284 may be coupled to communication circuit 250. DMA controller 294 may control reading of data from array member drive 284 and may control writing of data to array member drive 284.

Array member drives 281, 282, 283 and 284 may together comprise storage array 280. The storage array 280 illustrated in FIG. 2 may be a RAID array, but this is not intended to be limiting. Array member drives 281, 282, 283 and 284 may comprise a different type of storage array.

In operation, system 200 may compute parity information and may store the computed parity information within storage array 280. Processor 210 may initiate a transfer of data. Source data may be read from processor memory 220 and may be written to accelerator memory 230 by DMA controller 231. Accelerator 240 may read the source data from accelerator memory 230 and may compute parity information based on the source data and may write the parity result in accelerator memory 230. Accelerator 240 may issue a notification to processor 210 after the parity result is written to accelerator memory 230. The notification may be an interrupt signal, a register write, or another type of notification not specifically mentioned. The parity result may also be termed parity information or parity data.

In operation, processor 210 may issue a command to one of array member drives 281, 282, 283, 284, the command to instruct the DMA controller in the respective array member drive to read data from accelerator memory 230 and write the data to at least one of array member drives 281, 282, 283, 284. Accelerator memory 230 may contain a parity result computed by accelerator 240. The DMA controller in the respective array member drive may control read of data from accelerator memory 220 and write the parity result to at least one of array member drives 281, 282, 283, 284. The DMA controller in the respective array member drive may control read of source data from accelerator memory 220 and write the source data to at least one of array member drives 281, 282, 283, 284. The parity result may also be termed parity data. The DMA controller in the respective array member drive may control write of data from processor memory 220 to storage array 280.

In one of various examples, processor 210 may issue a command to array member drive 281. The command may instruct DMA controller 291 to move data from accelerator memory 230 to array member drive 281. Parity data may be moved from accelerator memory 230 to array member drive 281 by DMA controller 291. Source data may be moved from accelerator memory 230 to array member drive 282 by DMA controller 292. Source data may be moved from accelerator memory 230 to array member drive 283 by DMA controller 293. Source data may be moved from accelerator memory 230 to array member drive 284 by DMA controller 294. In another example, processor 210 may issue a command to array member drive 282. The command may instruct DMA controller 292 to move data from accelerator memory 230 to array member drive 282. Parity data may be moved from accelerator memory 230 to array member drive 282 by DMA controller 292. Source data may be moved from accelerator memory 230 to array member drive 281 by DMA controller 291. Source data may be moved from accelerator memory 230 to array member drive 283 by DMA controller 293. Source data may be moved from accelerator memory 230 to array member drive 284 by DMA controller 294.

In another example, processor 210 may issue a command to array member drive 283. The command may instruct DMA controller 293 to move data from accelerator memory 230 to array member drive 283. Parity data may be moved from accelerator memory 230 to array member drive 283 by DMA controller 293. Source data may be moved from accelerator memory 230 to array member drive 281 by DMA controller 291. Source data may be moved from accelerator memory 230 to array member drive 282 by DMA controller 292. Source data may be moved from accelerator memory 230 to array member drive 284 by DMA controller 294. In another example, processor 210 may issue a command to array member drive 284. The command may instruct DMA controller 294 to move data from accelerator memory 230 to array member drive 284. Parity data may be moved from accelerator memory 230 to array member drive 284 by DMA controller 294. Source data may be moved from accelerator memory 230 to array member drive 281 by DMA controller 291. Source data may be moved from accelerator memory 230 to array member drive 282 by DMA controller 292. Source data may be moved from accelerator memory 230 to array member drive 283 by DMA controller 293.

In this manner, parity data may be computed and may be stored in any one of array member drives 281, 282, 283 and 284. Source data may be stored in three of array member drives 281, 282, 283, and 284. Source data may be stored in a different array member drive from the array member drive where parity data is stored. Parity data and source data may be stored within a stripe of storage array 280, the stripe comprising strips of array member drives 281, 282, 283, and 284.

After the data is written from accelerator memory 230 to at least one of array member drives 281, 282, 283, 284, storage array 280 may issue a notification to processor 210 to indicate completion. The notification may be an interrupt signal, a register write, or another type of notification not specifically mentioned.

In the event of damage to storage array 280, data within array member drives 281, 282, 283 and 284 may be reconstructed based on the parity information stored in respective array member drives 281, 282, 283, and 284 and the source data stored in respective array member drives 281, 282, 283 and 284.

In operation, system 200 may implement a Peer-to-Peer DMA system to move data between memory components, without limitation. In one of various examples, DMA controller 231 may move data between any of processor memory 220, accelerator memory 230 and array member drive 281. In another example, DMA controller 231 may move data between processor memory 220 and accelerator memory 230. These examples of data movement are not intended to be limiting. DMA controllers may move data between any memory components in system 200.

Figure 3:
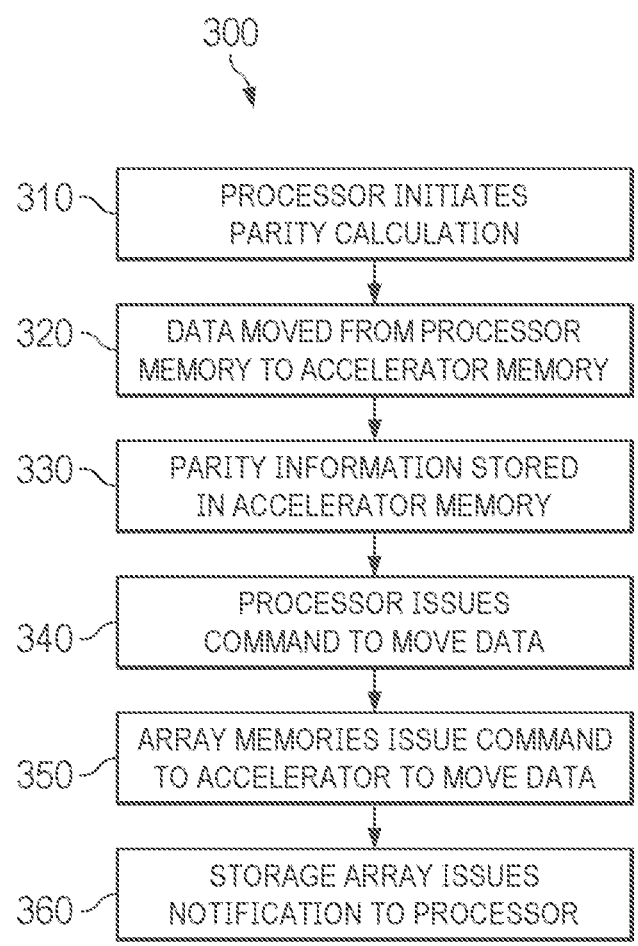
FIG. 3 illustrates a method for computing parity information in a storage array.

FIG. 3 illustrates a method 300 for computing parity information in a RAID array.

At operation 310, a processor may initiate a parity calculation. The processor may be a CPU or other processor device.

At operation 320, source data may be moved from a processor memory to an accelerator memory. The movement of the source data may be performed by a DMA controller. An accelerator processor may perform a parity calculation based on the source data in the accelerator memory and may calculate parity information.

At operation 330, the parity information may be stored at a predetermined location within the accelerator memory. A notification may be sent to the processor after the parity information is stored within the accelerator memory.

At operation 340, the processor may issue a command to one or more array member drives, which as indicated above may respectively be storage drives, the command to instruct the one or more storage drives to move the parity data from the predetermined location within the accelerator memory and the command to instruct the one or more storage drives to move the source data from within the accelerator memory and to at least one of the array member drives.

At operation 350, the one or more array member drives may issue a command to the accelerator, the command to pull data from the predetermined location in the accelerator memory and transfer the parity information to at least one of the array member drives and to transfer the source data from the processor memory to at least one of the array member drives. A DMA controller may control the transfer of data from the accelerator memory to the at least one of the array member drives.

At operation 360, the one or more array member drives of the storage array may issue a command to the processor, the command indicative of completion of the move of the source data and the parity data.

The invention claimed is:

1. A system comprising:
   a processor;
   a processor memory coupled to the processor;
   a storage array comprising one or more array member drives, the respective array member drives including a DMA controller;
   an accelerator;
   an accelerator memory including a DMA controller;
   a communication circuit coupled to the processor, the accelerator, the accelerator memory, and the storage array; and
   wherein the processor to instruct the DMA controller in the accelerator memory to move source data between the processor memory and the accelerator memory, and wherein the accelerator to perform a parity calculation on the source data stored in the accelerator memory and the DMA controller in one of the one or more array member drives to request the parity result, and the DMA controller in the accelerator memory to write the parity result and the source data to the one or more array member drives.

2. The system as claimed in claim 1, the one or more array member drives divided into strips, the strips comprising a plurality of contiguous storage locations within the respective array member drives.

3. The system as claimed in claim 2, the one or more array member drives grouped into stripes, the stripes comprising one strip from respective array member drives.

4. The system as claimed in claim 1, the DMA controller in the accelerator memory to move data between the processor memory and at least one of the accelerator memory and the one or more array member drives.

5. The system as claimed in claim 1, the DMA controller in the accelerator memory to write the parity result to the one or more array member drives.

6. The system as claimed in claim 1, the one or more array member drives comprising four memory devices configured as a Redundant Array of Independent Disks (RAID) array.

7. The system as claimed in claim 6, the four memory devices to store source data and parity information.

8. The system as claimed in claim 1, the system to utilize Peer-to-Peer DMA communication between the processor memory, the accelerator memory and at least one of the array member drives.

9. The system as claimed in claim 8, the system to write parity data and source data to one or more array member drives.

10. The system as claimed in claim 9, the system to write parity data to one of the array member drives and to write source data to the remaining array member drives.

11. A method comprising:
    initiating a parity calculation by a processor;
    moving source data by a DMA transfer from a processor memory to an accelerator memory, the accelerator to calculate parity information, the parity information based on the source data moved to the accelerator memory;
    storing the calculated parity information in a predetermined location in the accelerator memory;
    issuing notification from the accelerator to the processor, the notification to indicate the completion of the parity calculation;
    issuing a command from the processor to one of a plurality of array member drives;
    moving the parity data by a DMA transfer from the predetermined location in the accelerator memory to one of the plurality of array member drives and moving the source data from the accelerator memory to at least one of the array member drives; and issuing a notification from one of the plurality of array member drives to the processor.

12. The method as claimed in claim 11, the plurality of array member drives comprising a storage array.

13. The method as claimed in claim 12, the storage array comprising a Redundant Array of Independent Disks (RAID) array.

14. The method as claimed in claim 12, the storage array divided into stripes, the stripes comprising one strip from respective array member drives.

15. The method as claimed in claim 11, the plurality of array member drives respectively divided into strips, the strips comprising a plurality of contiguous memory locations within the respective array member drive.

16. The method as claimed in claim 11, the calculated parity information based on an exclusive-OR computation of data in two or more array member drive locations.

17. The method as claimed in claim 11, the method to utilize Peer-to-Peer DMA communication between the processor memory, the accelerator memory, and at least one of the array member drives.

18. The method as claimed in claim 17, the method to write parity data and source data to the array member drives.

* * * * *